United States Patent

[11] 3,586,837

[72] Inventors Gilbert P. Hyatt;
Eugene Ohlberg, both of Northridge, Calif.
[21] Appl. No. 725,468
[22] Filed Apr. 30, 1968
[45] Patented June 22, 1971
[73] Assignee Teledyne Industries, Inc.

[54] ELECTRICALLY ALTERABLE DIGITAL DIFFERENTIAL ANALYZER
25 Claims, 8 Drawing Figs.

[52] U.S. Cl. .......... 235/150.31, 235/152
[51] Int. Cl. .......... G06j 1/02
[50] Field of Search .......... 235/150.31, 150.3, 150.4, 150.5, 150.51, 150.52, 150.53, 164, 152, 160

[56] References Cited

UNITED STATES PATENTS

| | | | |
|---|---|---|---|
| 3,174,106 | 3/1965 | Urban | 235/160 UX |
| 3,274,376 | 9/1966 | Evans et al. | 235/150.31 |
| 3,388,241 | 6/1968 | Isaacs | 235/150.5 X |
| 3,406,379 | 10/1968 | Paleusky et al. | 235/150.31 X |
| 3,419,711 | 12/1968 | Hunter et al. | 235/150.31 |
| 3,422,435 | 1/1969 | Cragon et al. | 235/150.51 X |

*Primary Examiner*—Malcolm A. Morrison
*Assistant Examiner*—Joseph F. Ruggiero
*Attorney*—Fraser and Bogucki

ABSTRACT: An arrangement is provided in which the inputs and outputs of digital differential analyzer integrators are interconnected under program control by encoding and decoding the incremental *dz* integrator output signals in space and time domains. The integrators operate in parallel word fashion, the sum of the dependent incremental input variables *dy* being added to a parallel arrangement of full adders in the Y register to update the value of Y, and the updated value of Y being transferred via the full adders to a parallel arrangement of full adders in the R register under the control of independent variables *dx* during iteration. The independent *dx* variables are stored and employed to transfer weighted portions of the dependent incremental input variable sums into the R register during subsequent iterations to provide higher order correction of the Y values.

INVENTORS.
GILBERT P. HYATT
EUGENE OHLBERG
BY
Fraser and Bogucki
ATTORNEYS

INVENTORS.
GILBERT P. HYATT
EUGENE OHLBERG
BY
Fraser and Bogucki
ATTORNEYS

INVENTORS.
GILBERT P. HYATT
EUGENE OHLBERG
BY *Fraser and Bogucki*
ATTORNEYS

INVENTORS.
GILBERT P. HYATT
EUGENE OHLBERG
BY
Fraser and Bogucki
ATTORNEYS

INVENTORS.
GILBERT P. HYATT
EUGENE OHLBERG
BY
Fraser and Bogucki
ATTORNEYS

INVENTORS.
GILBERT P. HYATT
EUGENE OHLBERG
BY
Fraser and Bogucki
ATTORNEYS

INVENTORS.
GILBERT P. HYATT
EUGENE OHLBERG
BY Fraser and Bogucki
ATTORNEYS

ELECTRICALLY ALTERABLE DIGITAL DIFFERENTIAL ANALYZER

BACKGROUND OF THE INVENTION

1. Field of the Invention

The present invention relates to computational systems, and more particularly to digital differential analyzers in which integrators or other computational elements function as the digital equivalent of an analog computer to solve differential equations and the like.

2. Description of the Prior Art

Special purpose devices such as digital differential analyzers (hereinafter referred to as DDA's) have found widespread use in the solution of problems involving analog quantities. The DDA may be used in conjunction with a general purpose computer as primary or ancillary equipment to solve problems, and as such provides a digital equivalent which 19th faster and more accurate than wheel-and-disc and other analog arrangements.

Despite the many advantages to be realized from DDA's as special purpose computational devices, presently known arrangement have a number of shortcomings which can seriously limit their effectiveness in certain applications. In parallel computation DDA's for example, a problem is solved by interconnecting the various inputs and outputs of a plurality of integrators or other computational elements in a particular order. This is normally accomplished by a patchboard or patchpanel, the various terminals which represent the integrator inputs and outputs being interconnected by wires which are soldered or otherwise appropriately fastened to such terminals. The hand wiring of a patchboard consumes a considerable amount of time and may require that the DDA be inoperative during a period of time in which many problems might be solved in a high demand system. With the hand wired patchboard incorporated into the DDA, iterations are sequentially performed until a particular problem or problems are solved. In many instances, however, the particular order of integrator input and output interconnection must be changed after only a few iterations in order to continue the solution of a problem or to initiate the solution of a different problem. Again the patchboard must be hand wired to effect the new order of interconnection, a procedure which involves a considerable time loss.

Conventional DDA arrangements suffer a further disadvantage in the time required for computation. With the integrator inputs and outputs interconnected in a desired manner, the integrators sequence through a number of iterations, the Y parameter which is stored in a Y register being changed in accordance with new $dy$ increments at the end of each iteration and the updated values of Y being transferred into the R register during subsequent iterations under the control of the independent incremental variables $dx$ to change the value of R. For many applications of the DDA such as in real time systems, the time required to update the value of Y and transfer it into the R register may be excessive. This is due partly to the fact the new incremental $dy$ values are typically added to the Y register in serial word fashion, the $dy$ signals being applied to the flip-flop or other appropriate memory element of the least significant stage of the Y register and sequenced through subsequent stages of the register under the control of a single full adder. The updated or new value of Y having been established in the Y register, such value of Y is transferred to the R register in similar fashion during the next iteration, the value of Y being applied to the flip-flop of the least significant bit stage of the R register and sequenced through other stages thereof under the control of a full adder.

Depending upon the particular application of the DDA, the accuracy of the computations thereof may be unacceptable. Each addition of a new value of Y to the R register effectively adds the area of a rectangle having dimensions of Y and $dx$ . A second order or trapezoidal correction of each new value of Y generally results in a considerable improvement in system accuracy at the expense of additional equipment required to effect such a correction. A separate register approximately equal in complexity to that of the Y register is typically employed to store a value of Y so that such value can be appropriately altered at a later time and added to the R register to effect the desired correction. Where corrections to the second or higher orders are required to provide acceptable system accuracy, the additional equipment may render the resulting system prohibitive from the standpoints of cost and size alone.

Ideally then, a DDA should be capable of effecting a rapid and accurate interconnection of the computational element outputs and inputs in any desired order. The integrators themselves should be capable of updating and transferring the values of Y in parallel word fashion, and should be capable of performing higher order corrections of the values of Y without requiring prohibitive amounts of equipment to do so.

BRIEF SUMMARY OF THE INVENTION

In brief, the present invention provides an electrically alterable DDA in which the computational element inputs and outputs are interconnected by a program controlled arrangement which encodes and decodes the incremental $dz$ outputs. Where a plurality of integrators are arranged to operate in parallel computational fashion, the $dz$ output signals of the integrators are encoded by multiplexing onto a plurality of buses which are common to all inputs of all integrators. Apparatus coupled between each of the buses and each of the integrator inputs responds to bits stored in program registers to decode a space multiplexed $dz$ increment signal by coupling that bus which contains the desired $dz$ increment to the associated integrator input. Each integrator input may be inhibited by program register bits which prevent the passage of any $dz$ increment signal to the input, and sign of the $dz$ increment may be changed under the control of appropriate program register bits.

The electrically alterable interconnectivity provides for the connection of a plurality of the integrator outputs to a plurality of the integrator inputs. The interconnections are determined by signals from an external control device such as a general purpose computer, the signals being decoded by program logic circuits to enter the appropriate control bits into the program registers. The order of interconnection may be changed at the end of any iteration and prior to the next iteration by appropriate signals from the external control device. The new signals result in appropriate changes in the bits stored within the program registers, and the systems responds to the new bits to effect the desired interconnection.

In accordance with a particular feature of the invention the amount of equipment required to encode and decode the various $dz$ increment signals in order to effect a desired interconnection may be considerably reduced at the expense of a slight increase in the time required for interconnection by multiplexing the $dz$ increment signals in the time domain as well as in the space domain. In such an arrangement each one of the plurality of buses is time shared by a plurality of the integrators, the $dz$ incremental signals therefrom being time multiplexed on the associated bus. The decoding apparatus associated with each integrator input includes time decoding apparatus which responds to programmable bits stored in the program register to decode the desired $dz$ increment in the time domain as well as in the space domain. The space decoding circuitry accordingly selects the particular one of the buses on which the desired $dz$ increment signal is carried, and the time decoding circuitry selects the desired signal from all others which are multiplexed on the same bus by being enabled only during the time interval in which the desired signal occurs.

In accordance with a further aspect of the invention the computational speed of the DDA is greatly increased by an arrangement of DDA integrators which operate in parallel computation, parallel word fashion. The dependent incremental variables $dy$ used to update the value of Y during each iteration are summed in a counter and added in parallel fashion to the Y register via a parallel arrangement of full adders. During a subsequent cycle of the iteration the updated value of Y is transferred into the R register in parallel fashion via the Y register parallel full adders and a parallel arrangement of full adders in the R register.

In accordance with a particular feature of the invention, a considerable savings in the required componentry for the DDA may be realized by operating the integrators in parallel word fashion only during computation. Initial conditions can be loaded into the Y and R registers of each integrator prior to computation by logic circuitry which can switch each Y register into a serial shift mode of operation. At the conclusion of computation the desired values of Y are read out and at the same time preserved by logic circuitry which may initiate a recirculation mode of operation within the Y register if desired. The stored value of Y may shift in serial fashion through the various stages of the Y register to the output thereof, then along a recirculation loop to the input end of the register.

In accordance with a further feature of the invention the apparatus for interconnecting the integrator inputs and outputs in electrically alterable fashion includes an arrangement for effecting the desired scaling of each integrator for each iteration in accordance with appropriate bits stored in the program registers. With the R register of each integrator arranged in parallel work fashion, the carry outputs of the full adders in selected ones of the R register stages are coupled to output lines. The selection of one of the output lines to implement a programmable register length is made under the control of the appropriate selection bits stored in the program registers, the carry signal on the selected output line being coupled to the space and time encoding apparatus as the *dz* incremental output of the integrator.

In accordance with further aspects of the invention the accuracy of the integrators is greatly enhanced by an arrangement which provides for the higher order correction of Y values using a minimum of additional equipment. The prior nonzero values of *dx* are stored along with the values of *dy* for each iteration. During subsequent iterations the stored values of *dx* are used to weight the stored *dy* values, and the weighted *dy* values are added to or subtracted from the value of R in the R register to correct previous values of Y.

BRIEF DESCRIPTION OF THE DRAWINGS

The foregoing and other objects, features and advantages will be apparent from the following more particular description of the preferred embodiments of the invention as illustrated with the accompanying drawings.

DETAILED DESCRIPTION

Figure 1:
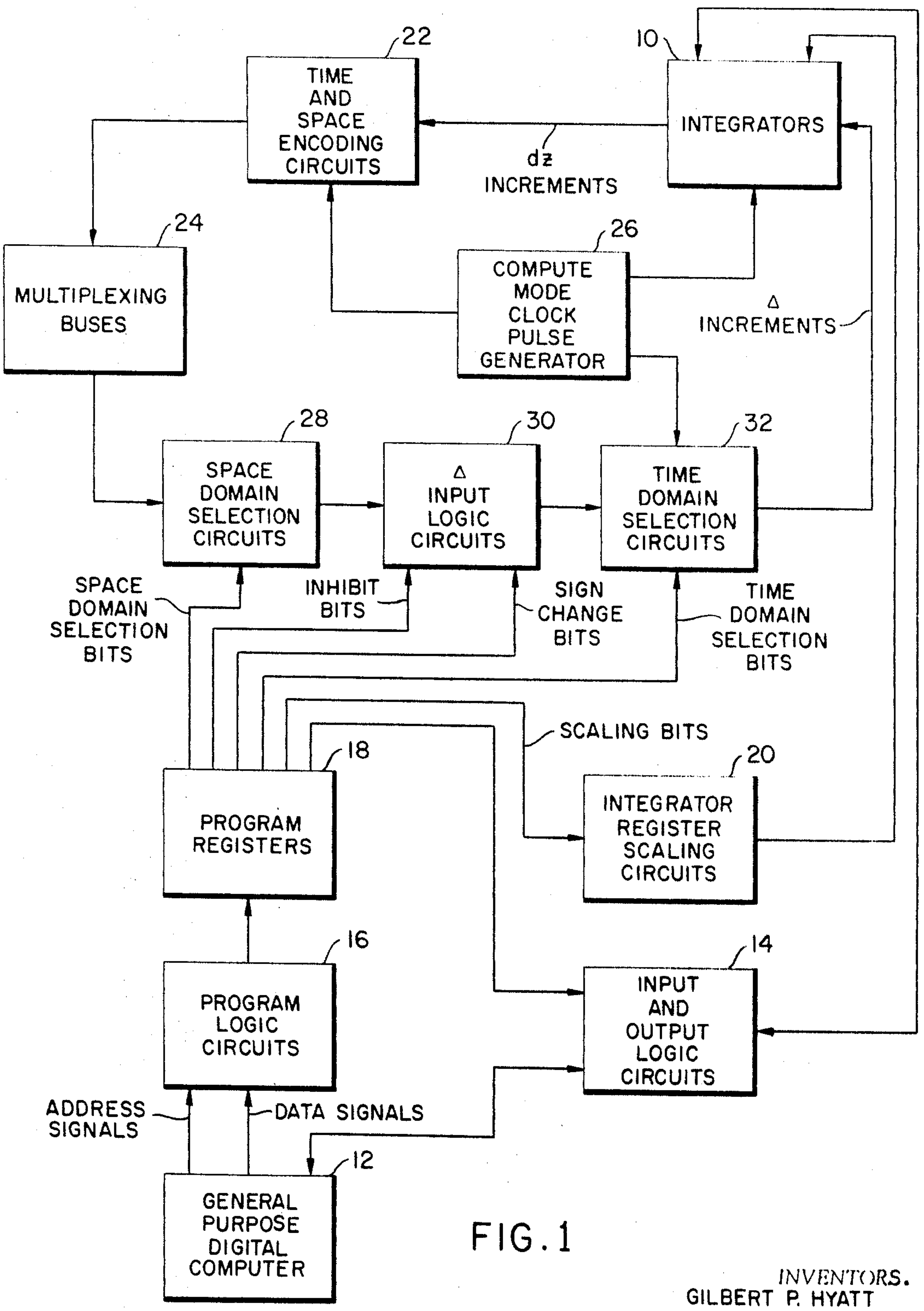
FIG. 1 is a block diagram of one generalized arrangement of an electrically alterable digital differential analyzer in accordance with the invention.

One example of an electrically alterable digital differential analyzer in accordance with the invention is illustrated in block diagram form in FIG. 1. The computational elements which in this instance comprise a plurality of integrators 10 are controlled by a general purpose digital computer 12. The computational elements are illustrated in FIG. 1 and hereafter as comprising integrators for purposes of illustration only, and it should be understood other appropriate elements such as servos or adders can be used in lieu of or in conjunction with the integrators 10. In order to prepare the integrators 10 for the solution of a particular problem or problems, it is necessary to load initial conditions into the various integrator registers. This is accomplished during an initialize mode of the DDA by entering data representing the desired initial conditions into selected ones of the integrator registers from the general purpose digital computed 12 via the input portion of input and output logic circuits 14. The integrators 10 are then sequenced through one or more iterations during a compute mode of operation to solve the problem and the desired information is subsequently passed to the computed 12 via the input and output logic circuits 14 during a readout mode of operation.

A single integrator iteration, which may be defined as a single incremental computation, is seldom if ever sufficient to solve a problem and a considerable number of iterations is frequently required. If a parallel computation arrangement is used in which a plurality of different integrators are caused to operate at the same time, it is necessary to interconnect the output leads of the various integrators with selected input leads thereof so that the incremental output quantities at the end of each iteration are applied as incremental inputs to the integrators for the next iteration. The interconnection of integrator inputs and outputs which follow a particular program or programs for the problem to be solved is typically effected by a mechanical patchboard or patchpanel in conventional systems. In such systems the interconnection wires or leads are soldered or otherwise appropriately connected to various terminals within the patchboard. Such an operation requires considerable time and can seriously limit the effectiveness of the system, particularly where the requirement for fast interconnection is present. A further problem arises where the interconnections must be periodically changed after a number of iterations of the integrators in order to solve the problem. Where a patchboard is used as the means of interconnection, the interconnecting leads or wires must be disconnected and soldered or otherwise connected to other terminals before further iterations can be initiated in the problem solving process.

In accordance with the present invention the DDA is made electrically alterable in the sense that the various outputs and inputs of the computational elements may be interconnected in a particular manner for one or more iterations of the elements, then disconnected and reconnected in a different manner for other iterations as may be required by the problem program, each interconnection of the outputs and inputs occuring in a matter of tens of nanoseconds. As shown in FIG. 1, the controlling external element for the system which in this instance comprises the general purpose digital computer 12, addresses and feeds data signals into program logic circuits 16 for conversion into bit signals in accordance with various logic schemes contained therein. The bit signals which are stored in program registers 18 enable circuitry associated with the inputs of each of the integrators 10 to select the desired incremental input signals from among a plurality of integrator output signals which are encoded in both time and space domains. The integrator registers are assumed to utilize a binary system of bit storage, and a single stage of the R register within each integrator is chosen for scaling purposes by integrator register scaling circuits 20 which operate under the control of scaling bits stored in the program registers 18. The selected R register stages provide incremental outputs *dz* which are fed to time and space encoding circuits 22 where they are multiplexed onto a plurality of buses 24 under control of a compute mode clock pulse generator 26.

The arrangement of FIG. 1 is described and hereafter illustrated as comprising 64 of the computational elements or integrators 10 by way of example only. It will be apparent to those skilled in the art that arrangements and numbers of the computational elements other than that described and illustrated may be used within the scope of the invention.

Assuming each of the 64 different integrators 10 to be capable of providing a single incremental *dz* output, a total of eight of the multiplexing buses 24 is chosen and eight of the *dz* increments are multiplexed onto each of the buses. This is accomplished by the space encoding portion of the circuits 22. The eight *dz* increments on each of the buses 24 are time multiplexed by the time portion of the encoding circuits 22 so as to occupy different time positions on the bus. Each of the *dz* increments may be applied to one or more of the integrator inputs by space domain selection circuits 28, the particular one of the multiplexing buses 24 which contains a desired *dz* increment for a particular one of the integrator inputs being selected by space domain selection bits from the program registers 18. The space domain selection bits are decoded in the space domain selection circuit 28 associated with a particular integrator input, and the eight time multiplexed *dz* increments on tee selected bus are passed to Δ input logic circuits 30. The Δ input logic circuits 30 respond to inhibit bits from the program registers 18 to block the passage of *dz* increments to particular inputs of the integrators 10 if it is determined that such inputs are not to receive a signal. Those *dz* increments which are not inhibited may have their signs changed by the Δ input logic circuits 30 as determined by sign change bits from the program registers 18. Those *dz* increments which are not inhibited by the Δ input logic circuits 30 are passed to time domain selection circuits 32 which operate under the control of time domain selection bits from the program registers 18 and the compute mode clock pulse generator 26 to select the time position in each series of eight *dz* increments containing the desired increment for each of the integrator inputs. The incremental values, which at this point are conveniently referred to as Δ increments, are passed to the corresponding integrator inputs where they may function as dependent variables *dy* and independent variables *dx* for subsequent cycles of that iteration of the integrators 10.

The Δ increments having been applied to the various integrator inputs, the integrators may sequence through one or more iterations under the control of the compute mode clock pulse generator 26. If the same interconnection of integrator inputs and outputs is to be maintained, the space and time domain selection circuits 28 and 32 continue to select the desired input signals from the same buses and time positions. The interconnections may be changed after any iteration however by changing the bits which are stored in the program registers 18. The newly stored bits enable the selection circuits 28 and 32 to select new *dz* increments for the integrator inputs, and the increments may be inhibited or changed in sign as desired by the Δ input logic circuits 30. When the desired iterations are completed, the output information is fed from the integrators 10 to the general purpose digital computer 12 via the output portion of the input and output logic circuits 14.

The electrical interconnectability and alterability of the arrangement shown in FIG. 1 significantly enhances the utility thereof at the expense of some increase in the required componentry or hardware of the system. Errors which commonly occur in patchboard or patchpanel interconnection of the computational elements are eliminated, and the arrangement may be programmed by the use of assembler and compiler routines which place it in the utilization class of commercial general purpose computers. The general purpose digital computer 12 is shown as one example of external apparatus which may be used to feed the necessary information into the system. Other appropriate external apparatus such as a tape reader can alternatively be used to perform such a function.

Figure 2:
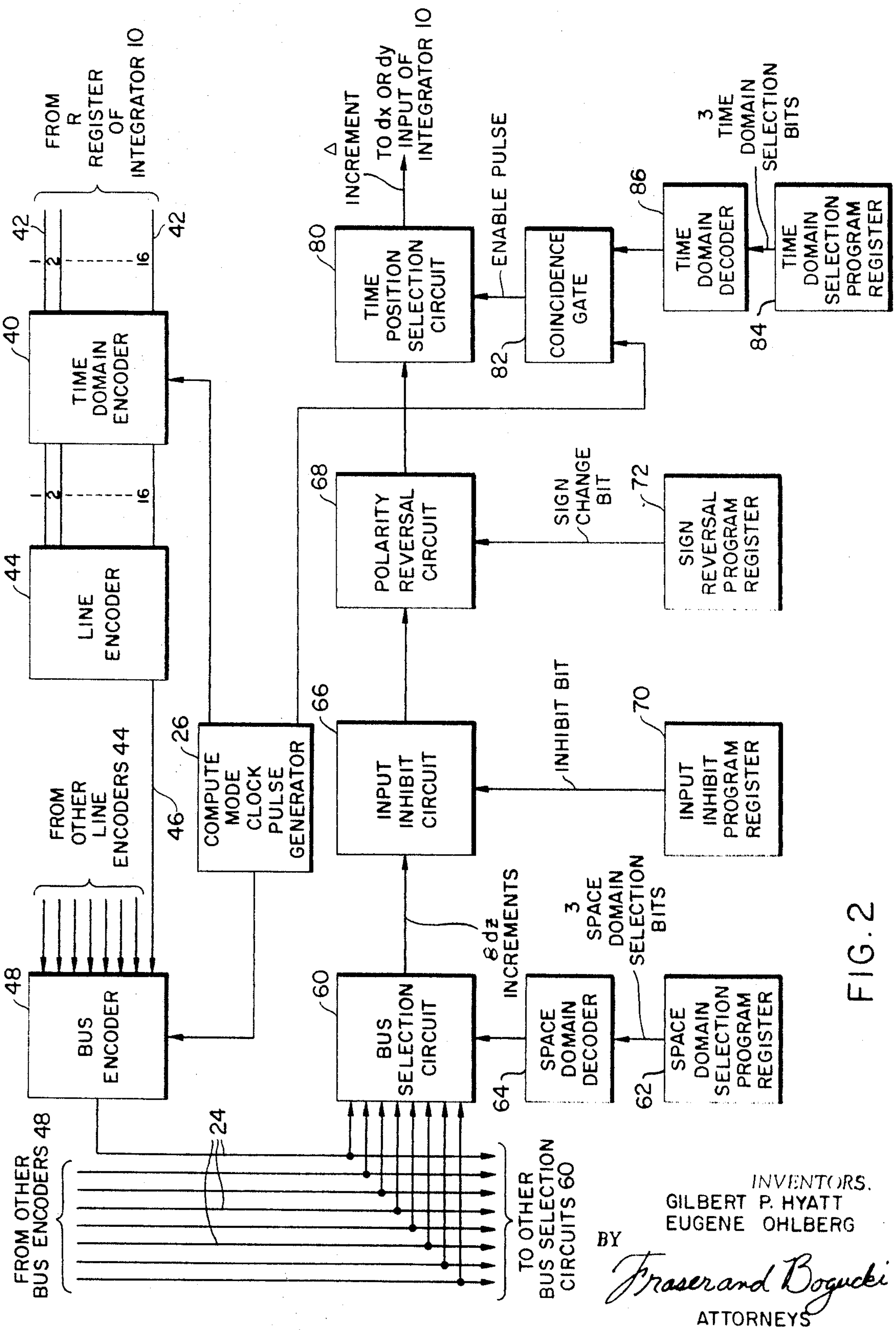
FIG. 2 is a block diagram showing the encoding and decoding portions of the arrangement of FIG. 1 in greater detail.

The apparatus for interconnecting the output of one of the integrators 10 with one of the inputs of the same integrator or another one of the integrators 10 is shown in greater detail in FIG. 2. In accordance with the invention the overall speed and versatility of the digital differential analyzer are greatly enhanced by integrators having registers which store and transfer words in parallel fashion as discussed hereafter. Each stage of the integrator R registers includes a full adder, the carry output of which provides one possible value for the output increment *dz* of the integrator. The output of each integrator comprises 16 lines which are coupled to the carry outputs of the full adders in 16 different stages of the R register thereof. The scaling of each integrator is accomplished by the programmed selection of one of the 16 output lines using apparatus which is described in connection with FIG. 4. Accordingly, the output of a particular one of the integrators 10 which is coupled to a time domain encoder 40 is illustrated in FIG. 2 as comprising 16 different lines 42, one of which is determined to contain the *dz* increment for the integrator 10. The signal on one of the lines 42 selected to represent the incremental value *dz* is passed to the 14 time domain encoder 40 while the signals on all other lines 42 are inhibited.

The various signal lines such as the integrator output lines 42 are moreover illustrated in FIG. 2 as comprising single lines for ease of illustration only. Each of such lines may comprise the required number of electrical leads or conductors to implement the particular type of incremental arithmetic being used in the system. In one preferred arrangement of the invention to be described in connection with FIG. 2 and illustrated hereafter, a ternary or three-state system is used and each of the signal lines comprises two wires, one of which may carry a signal representing "+1" and the other of which may carry a signal representing "−1." A value of zero is represented by the absence of a signal on either of the wires.

The time domain encoder 40 shown in FIG. 2 comprises the time portion of the time and space encoding circuits 22 illustrated in FIG. 1. Since eight different incremental values *dz* are to occupy different time positions on a single one of the multiplexing buses 24, the time domain encoder 40 holds the *dz* increment on the selected one of the lines 42 until enabled by a selected one of eight different clock pulses from the generator 26. The enabling pulse identifies the time position which the incremental value *dz* is to occupy on an associated one of the buses 24 and distinguishes the *dz* output of the integrator 10 from the outputs of seven other integrators which are multiplexed on the same bus. Upon receipt of the enabling pulse from the generator 26, the time domain encoder 40 passes the signal representing the *dz* increment to a line encoder 44.

Although the signals on 15 of the 16 integrator output lines 42 are inhibited prior to their reaching the input of the time domain encoder 40, there is a possibility that two or more signals may appear at the output of the time domain encoder. The line encoder 44 which preferably comprises an OR circuit or apparatus for performing a similar function insures that no more than one *dz* increment signal will reach the line 46 at the output thereof. In a ternary system the time domain encoder 40 preferably comprises an arrangement of 32 AND gates, each pair of which is respectively associated with the positive and negative signal wires of one of the input lines 42. All of the inputs of the AND gate associated with the wire containing the *dz* increment is passed by such gate to one of the inputs of the OR gate comprising the line encoder 44.

The space portion of the time and space encoding circuits 22 shown in FIG. 1 comprises the line encoder 44 and a bus encoder 48 having eight different inputs, one of which is coupled to the output of the line encoder 44 via the line 46. The other seven inputs are coupled to the line encoder associated with the seven other integrators 10 which share the same one of the buses 24. The bus encoder 48 which is synchronized by the clock pulse generator 26 sequentially passes each of the eight different *dz* increment signals to the associated one of the buses 24. The bus encoder 48 may comprise any appropriate gating arrangement for insuring that the *dz* increment signals enter the associated bus 24 in sequential fashion.

In similar fashion the $dz$ increments from the other 56 integrators are time and spaced multiplexed onto the remaining seven buses 24. Each of the buses 24 therefore carries eight different $dz$ increment signals which are time multiplexed along the length thereof.

Any of the time multiplexed $dz$ increment signals on any of the buses 24 may be applied to one or more inputs of one or more of the integrators 10 in accordance with the invention, the arrangement of FIG. 2 illustrating apparatus for interconnecting the buses 24 to an input of one of the integrators 10. Each of the eight different multiplexing buses 24 is coupled to the input of a bus selection circuit 60. The program registers 18 include a space domain selection program register 62 which stores a plurality of bits identifying the particular one of the buses 24 on which a desired $dz$ increment signal is multiplexed. Any one of the eight different multiplexing buses 24 may be selected by three space domain selection bits stored in three different flip-flops within the space domain selection program register 62. A space domain decoder 64 comprises eight different AND gates, the various inputs of which are coupled to the flip-flops within the program register 62 such that one of the gates is enabled by the three selection bits to enable an input of a corresponding one of a plurality of AND gates within the bus selection circuit 60. The various AND gates within the bus selection circuit 60 are combined with NOR circuits to define a plurality of AND-OR-NOT circuits. The enabling of an appropriate one of the AND gates within the bus selection circuit 60 directs the eight time multiplexed $dz$ increments on the selected one of the buses 24 to an input inhibit circuit 66.

The Δ input logic circuits 30 shown in FIG. 1 comprise the input inhibit circuit 66 and a polarity reversal circuit 68 coupled to the output thereof. The program registers 18 include an input inhibitor register 70 which stores a single inhibit bit in a flip-flop, the outputs of which are coupled to the input inhibit circuit 66. If it is determined that the associated integrator input is not to receive a $dz$ increment, the inhibit circuit 66 responds to the inhibit bit stored within the register 70 to prevent the eight time multiplexed $dz$ increment signals from passing to the polarity reversal circuit 68. Assuming that the input is not to be inhibited however, the eight time multiplexed $dz$ increment signals are passed to the polarity reversal circuit 68 where the sign of each is changed by a sign change bit stored within a sign reversal program register 72 in the program registers 18 if desired.

The particular one of the eight different $dz$ increment signals which is to comprise the input to the integrator 10 is selected by a time position selection circuit 80 upon receipt of an enable pulse from a coincidence gate 82. Three different time domain selection bits which are stored in flip-flops within a time domain selection program register 84 of the program registers 18 are decoded by a time domain decoder 86 to apply an input signal to the coincidence gate 82 at the same time that a selected one of the eight different clock pulses from the generator 26 is applied. In this manner the time position of the desired $dz$ increment signal is identified, and the time position selection circuit 80 passes the signal to the integrator 10 as the $dx$ increment or one of the $dy$ increments to the exclusion of the other seven $dz$ increment signals at the input of the selection circuit.

One appropriate arrangement of the input inhibit circuit 66, the polarity reversal circuit 68, and the time position selection circuit 80 comprises an AND-OR-NOT circuit including four different AND gates, the outputs of different pairs of which are coupled to the inputs of respective ones of two different NOR gates. The flip-flop within the input inhibit program register 70 is coupled to disable an input of each of the AND gates whenever the $dz$ increment is to be inhibited. This results in the absence of a signal on the two ternary output lines from the NOR gates. Assuming that the $dz$ increment signal is not to be inhibited, the corresponding inputs at the AND gates are enabled. Signals on the positive wire from the bus selection circuit 60 are passed to the inputs of two of the AND gates, while signals on the negative wire from the selection circuit 60 are passed to inputs of the remaining two AND gates. The enable pulse from the coincidence gate 82 enables a third input of each of the AND gates simultaneously to define the time position of the desired $dz$ increment. A fourth input of one of the AND gates is enabled to provide an output signal therefrom by the flip-flop within the sign reversal program register 72, resulting in a signal at the output of that one of the pair of NOR gates representing the desired sign of the $dz$ increment.

Figure 5:
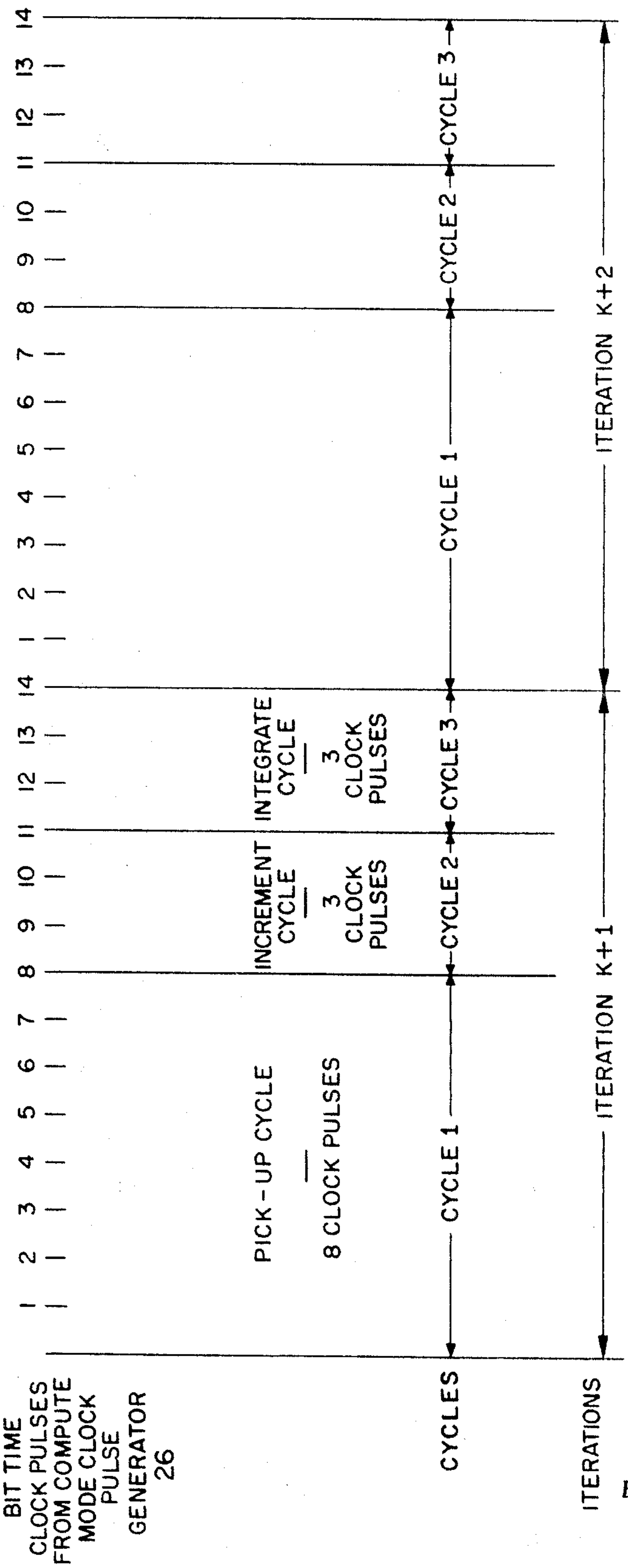
FIG. 5 is a timing diagram useful in explaining the operation of the integrator arrangement of FIG. 4.

As shown in FIG. 5 each iteration of the integrators 10 comprises three separate cycles, the first of which is termed the pickup cycle. It is during the 8-bit times of each pickup cycle that the $dz$ increment signals are encoded and decoded to effect the desired interconnection of inputs and outputs for that particular iteration. It has been found that arrangements in accordance with the invention can use a frequency of the clock pulse generator 26 on the order of 16 megacycles or higher. At this frequency the clock period is 71.4 nanoseconds and each pickup cycle requires 8-bit times or 570 nanoseconds. It will therefore be appreciated that an arrangement which is capable of effecting any desired interconnection in times on this order provides a system the speed and versatility of which far surpass arrangements which must be interconnected by conventional means.

The integrators 10 within the DDA sequence through one or more iterations to solve the basic equation $z = \int y dx$ or variations thereof by updating the parameter Y for each new input of dependent incremental variables $dy$, then adding the updated values of Y to a parameter R under the control of the independent variable $dx$ to obtain the desired $dz$ values. During each iteration the updated value of Y which is added to R represents an area the dimensions of which are Y and $dx$. Since most integrals when plotted in an $xy$ coordinate system assume curves which may vary considerably in their slope, the rectangular area bounded by Y and $dx$ is only a first order approximation. For most modern applications of the DDA, first order or rectangular integration does not provide needed accuracy, and the updated values of Y must be corrected to one or more higher orders. A second order or trapezoidal correction generally provides the needed accuracy for most system applications although correction to the third or higher orders is sometimes desirable. Second order or trapezoidal correction takes into account the slope of that portion of the integral curve encompassed by each $dx$. Third order correction goes a step further and takes into account the rate of change of the slope of that portion of the integral curve encompassed by $dx$.

Prior art DDA arrangements typically only perform the first order correction by storing the prior value of Y in an additional Y register, correcting the value of Y, then adding the corrected value to the R register. With that method, each order of correction would require an additional Y register, a second order arrangement for example requiring one additional Y register and a third order arrangement requiring two additional Y registers. The additional registers are quite costly and occupy valuable space within the system, particularly where large resistors are required to store values of Y comprising 20 or more bits for example.

Figures 3, 4:
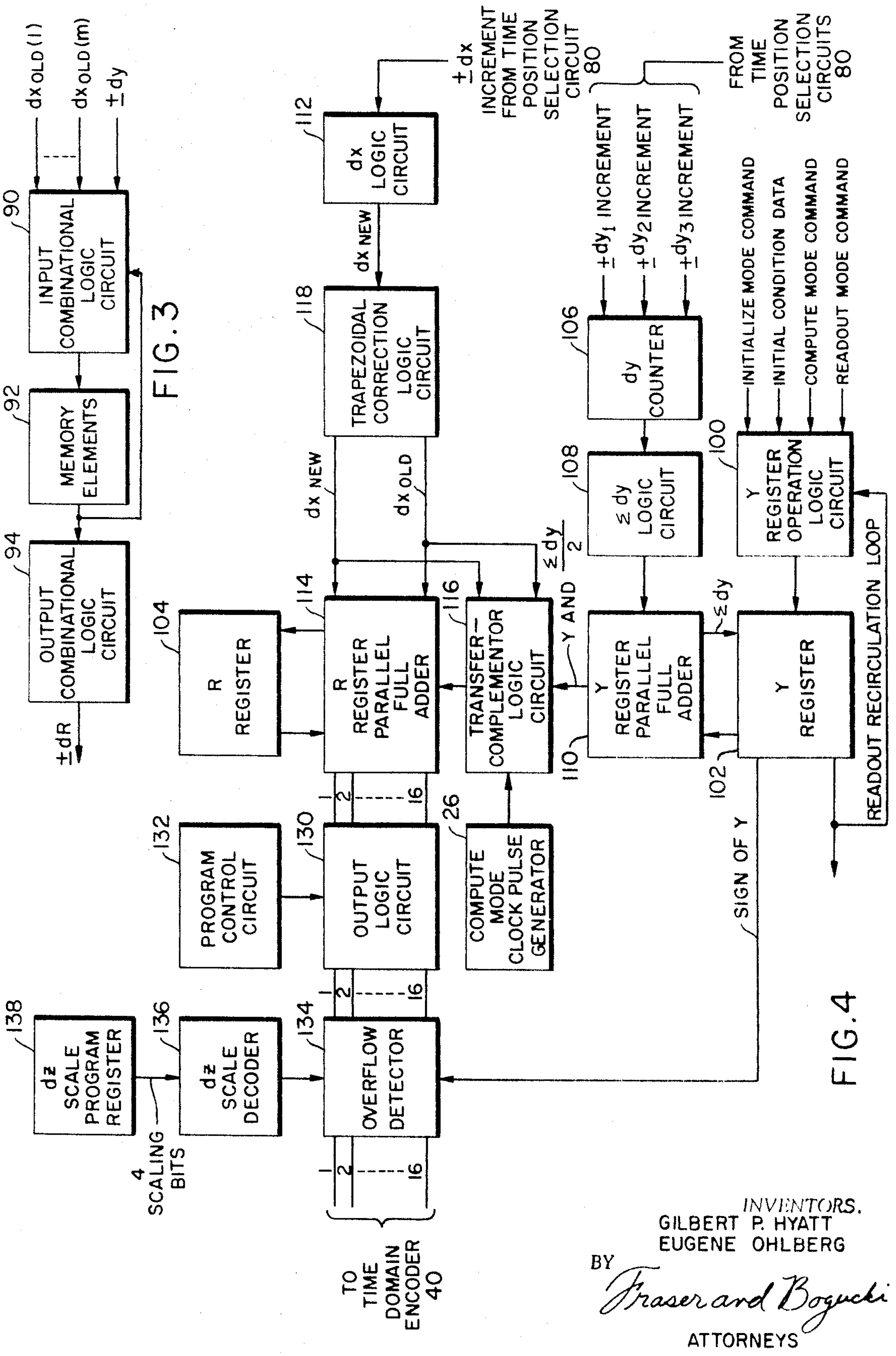
FIG. 3 is a simplified block diagram of a higher order correction arrangement in accordance with the invention.
FIG. 4 is a block diagram of one preferred arrangement of a parallel word integrator and associated scaling and higher order correction circuitry in accordance with the invention.

In accordance with the present invention the apparatus required to perform higher order corrections is greatly simplified by an arrangement which is shown in generalized form in FIG. 3. The arrangement stores the prior incremental values $dx$ rather than the prior values of Y, the values of $dy$ being weighted by the prior $dx$ values, then algebraically added to the R register to correct the values of R accordingly. The $dx$ values require only a few memory elements such as flip-flops since each value is typically represented by a single bit.

The Y parameter which is the ordinate of the integral curve in $xy$ coordinates may be expressed by the Taylor function:

$$Y(x+\Delta x) = Y(x) + Y'\Delta x + \frac{Y''\Delta x^2}{2!} + \frac{Y'''\Delta x^3}{3!} + \cdots$$

where $Y$ is the dependent parameter, $x$ is the independent variable, $\Delta x$ is the change in $x$, $Y'$ is the first derivative of $Y$, $Y''$ is the second derivative of $Y$, and $Y'''$ is the third derivative of $Y$. The first order term dictates the addition of $Y$ itself to the R register under the control of the present value of $dx$. The second order term $\frac{Y''\Delta x^2}{2!}$ involves the alteration of the change in the $Y$ parameter by 2!. This may be implemented by algebraically adding one-half the value of the $dy$ values received by the integrator during the subsequent iteration thereof under the control of the original $dx$ value. A second order or trapezoidal correction arrangement is incorporated into the arrangement which is shown in FIG. 4 and in greater detail in FIGS. 6 through 8. As will be discussed in connection with those figures the incremental value $dx$ for each iteration of the integration is stored, then used to transfer one-half the sum of the $dy$ incremental values into the R register during the next iteration. The factor of one-half is implemented by adding a bit stage at the least significant bit end of the R register and using this stage to receive the least significant bit of the $dy$ sum.

The third and higher orders of correction may be implemented in similar fashion in accordance with the invention. The third term for example involves 3! or 6, and an arrangement for correcting to this order can use any appropriate means such as a six-step counter for dividing by six.

The general circuit elements which are required to correct to any desired order in accordance with the invention are shown in FIG. 3. The $dx$ values for prior iterations of the integrator are stored by appropriate means such as flip-flop registers until a sufficient number of such values are available to perform a correction to the desired order. The stored values of $dx$ are conveniently referred to as $dx_{OLD}$, and one such value is required for each order to which the correction is to be carried beyond the first order. Thus the value $dx_{OLD(1)}$ would be required for each correction to the second order while all values $dx_{OLD(1)}$ through $dx_{OLD(m)}$ would be required for each correction to the $m$+1 order. The last nonzero $dx$ increment is stored as $dx_{OLD(1)}$. The next most recent nonzero $dx$ increment is stored as $dx_{OLD(2)}$ and the most recent $dx$ increment is stored as $dx_{OLD(m)}$.

At the start of each iteration an input combinational logic circuit 90 which is coupled to receive the stored values $dx_{OLD(1)}$ through $dx_{OLD(m)}$ and the $dy$ increments for that iteration adds a weighted value of the $dy$ increments to a correction parameter stored within memory elements 92. The weighting is a function of the $dx_{OLD}$ values and is determined primary by the order to which the correction is being carried. In the second order or trapezoidal correction scheme shown in FIG. 4 and thereafter, the single stored $dx_{OLD}$ value provides a weighting factor of one-half such that one-half the sum of the $dy$ increments or $\Sigma dy/2$ is added to the correction parameter. An output combinational logic circuit 94 determines when the correction parameter stored within the memory elements 92 is equal to or greater than a predetermined value, and adds the most significant part thereof $\pm dR$ to the R register to perform the correction. The less significant part of the correction parameter remains within the memory elements 92.

The electrically alterable innerconnection arrangement shown in FIG. 2 may be used with any appropriate DDA computational elements including integrators which operate in serial word fashion. As previously pointed out however, integrators which receive and transfer words in serial fashion are sufficiently slow in their operation so as to render them unsuitable for certain high speed applications. In accordance with the invention the time required for the integrators 10 to sequence through the various iterations while in the compute mode of operation is considerably reduced by integrators which load and transfer information in parallel word fashion. One preferred arrangement of an integrator which incorporates a second order term or trapezoidal correction scheme is illustrated in generalized form in FIG. 4.

The general purpose digital computer 12 shown in FIG. 1 initiates operation of the DDA by providing an initialize mode command signal to a Y register operation logic circuit 100 of each integrator 10 via the input and output logic circuits 14. The Y register operation logic circuit 100 responds to the initialize mode command signal to connect an associated Y register 102 in a serial shift arrangement. At the same time signals from the general purpose digital computer 12 clear the flip-flop memory elements in an R register 104. Initial condition data may then be loaded into the Y register 102 of each integrator from the general purpose digital computer 12, the applied data being serially loaded into the Y register 102 under the control of the Y register operation logic circuit 100. A clock pulse generator (not shown in FIG. 1) having a different frequency from that of the compute mode clock pulse generator 26 is used to synchronize the loading of the initial condition data into the Y registers 102 during the initialize mode of operation and to feed the readout information from the Y registers of the integrators 10 into the computer 12 via the input and output logic circuit 14 during the readout mode of operation. If the clock pulse generator has a frequency on the order of approximately 1 megacycle, and each of the words in the Y registers 102 of the 64 different integrators are assumed to comprise 20 bits, a total of 1,280-bit times or approximately 1,280 microseconds are required to carry out the initialize mode of operation.

The computer 12 terminates the initialize mode by removing the command signal from the Y register operation logic circuit 100. The logic circuit 100 responds by switching the Y register 102 back into a parallel word mode of operation in preparation for the compute mode.

The computer 12 initiates the compute mode of operation by applying a compute mode command signal to the Y register operation logic circuit 100. The integrators may then commence iterations under the synchronization of the compute mode clock pulse generator 26, the first eight pulses of each iteration defining the pickup cycle as shown in FIG. 5 during which the inputs and outputs thereof are interconnected in the desired manner. Each iteration is completed by sequencing through a second or increment cycle and a third or integrate cycle during the remaining 6-bit times as shown in FIG. 5.

For most applications of the DDA a total of three of the dependent incremental inputs $dy$ has been found to be satisfactory, and the arrangement of FIG. 4 is accordingly shown as comprising three such inputs $dy_1$, $dy_2$ and $dy_3$. In actual practice however, each integrator may be provided with any number of $dy$ incremental inputs as desired. The $dy$ increment signals from the three associated time position selection circuits 80 are sequentially counted by a $dy$ counter 106 to provide a sum $\Sigma dy$ to a $\Sigma dy$ logic circuit 108. The counter 106 may be of the up-down type and the resulting sum $\Sigma dy$ comprises three bits, two of which represent the value thereof and the third of which represents the sign thereof. The $\Sigma dy$ logic circuit 108 effects the parallel addition of the sums $\Sigma dy$ to the Y register 102 through a Y register parallel full adder 110 in a manner which is discussed in greater detail in connection with FIG. 6. The two value bits of the sum $\Sigma dy$ are added to the flip-flop storage elements in the two least significant bits stages of the Y register 102 and the sign bit of the sum $\Sigma dy$ is added in parallel to the flip-flops in the remaining stages of the Y register.

The independent incremental $dx$ value is received by a $dx$ logic circuit 112 from the associated time position selection circuit 80 at the same time as the $dy$ increments are received by the $dy$ counter 106. This $dx$ increment signal which is conveniently referred to as $dx_{NEW}$ is applied to an R register parallel full adder 114 and a transfer-complementor logic circuit 116 by a trapezoidal correction logic circuit 118. The logic circuit 118 stores the value of $dx_{NEW}$ so that it may be used during the next iteration to effect the second order term or trapezoidal correction of the value of R presently stored in the R register 104. During the second or increment cycle of the iteration as shown in FIG. 5 the previous value of $dx$ stored by the trapezoidal correction logic circuit 118 weights the sum $\Sigma dy$ by transferring one-half the value thereof to the R register 104 via the transfer-complementor logic circuit 116 to correct the previous value of R for the second order term. A total of 3-bit times are allotted for the increment cycle to allow the resulting carry signals to propogate through the R register 104 via the associated parallel full adder 114.

During the third or integrate cycle as shown in FIG. 5 the value of Y stored in the register 102 which has been updated by the sum $\Sigma dy$ is added to the R register 104 via the parallel full adder 114 under the control of the transfer-complementor logic circuit 116. The updated value of Y is added to the value of R in the R register 104 in parallel fashion, and the 3-bit times within the integrate cycle permit any resulting carry signals to propagate along the R register 104 via the parallel full adder 114.

As previously mentioned the output of each of the integrators 10 is scaled to provide the desired incremental output value $dz$ by selecting one of the different output lines from the R register 104, illustrated as 16 in number for purposes of the present example only. Although the R register 104 in the present example has a total of 19 stages, only 16 of the more significant bit stages are used for scaling purposes. The carry outputs of the full adders associated with the more significant bit stages of the R register 104 are coupled to an output logic circuit 130 which operates under the control of a program control circuit 132 to determine if a signal is present on the particular one of the output lines which has been chosen for scaling purposes to represent the incremental value $dz$. The lines at the output of the logic circuit 130 are coupled to an overflow detector 134 which defines an output as a function of the state of the last stage of the Y register 102 representing the sign of Y and the selected R register output line as defined by a $dz$ scale decoder 136. The program registers 18 include a $dz$ scale program register 138 which comprises an arrangement of four flip-flops for storing the four scaling bits which define the selected one of the 16 different output lines from the R register 104. The decoder 136 responds to the stored scaling bits within the program register 138 to provide a signal to the overflow detector 134. The detector 134 responds to the signal by inhibiting all of the 16 output lines except the one which carries the desired $dz$ incremental value. The $dz$ incremental signal is then passed to the time domain encoder 40 where it is time multiplexed onto a selected one of the buses 24 in the manner discussed in connection with FIG. 2.

Figure 6:
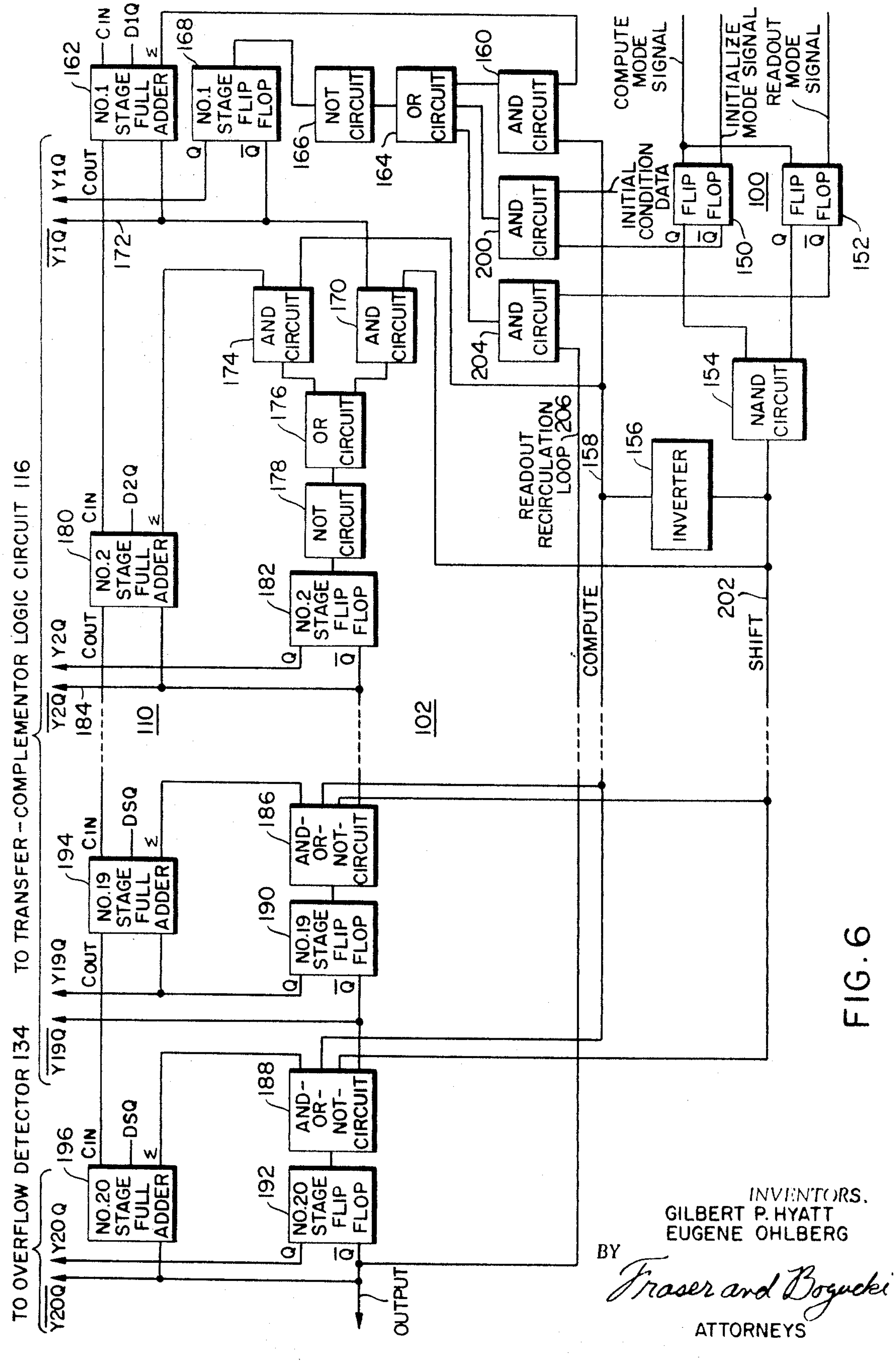
FIG. 6 is a block diagram showing the details of the Y register and associated input logic circuitry for the integrator arrangement of FIG. 4.

The details of the Y register operation logic circuit 100, the Y register 102 and the parallel full adder 110 are shown in FIG. 6, the first, second, 19th and 18th stages of the Y register being shown therein and the third through the 18th stages being omitted for the sake of clarity. Operation of the Y register 102 in parallel arithmetic fashion during the compute mode of operation is initiated by the application of the compute mode command signal from the general purpose digital computer 12 to the "1" or "true" inputs of a pair of flip-flops 150 and 152 in the Y register operation logic circuit 100. The resulting signals at the true outputs Q of the flip-flops 150, 152 enable both inputs of a NAND circuit 154 resulting in the absence of a signal at the output of the NAND circuit. The absence of a signal thereat is sensed by an inverter 156 to provide an output signal via a compute line 158 to enable one of the inputs of an AND circuit 160 in the first stage of the Y register 102. If the other input of the AND circuit 160 is enabled by a signal from the sum output $\Sigma$ of a full adder 162 within the first stage of the Y register, the resulting output signal from the AND circuit 160 is passed by an OR circuit 164 to a NOT circuit 166 where it is inverted to provide a logical zero condition to the input terminal of a flip-flop 168 within the first stage of the Y register. The first stage flip-flop 168 responds to the signal at the input terminal thereof by providing a signal at the complementary output $\overline{Q}$ thereof. The output signal is passed to the transfer-complementor logic circuit 116 via a lead 172 to represent the first stage bit signal $\overline{Y1Q}$ and to the first stage full adder 162 to represent the present state of the associated flip-flop 168. The full adder 162 sums a signal representing the present state of the flip-flop 168 and a signal which may be present at a carry input $C_{IN}$, a signal representing the sum thereof appearing at the summing output terminal $\Sigma$ and being applied to enable an input terminal of the AND circuit 160 and change the state of the flip-flop 168 as appropriate.

Although the signal at the complementary output $\overline{Q}$ of the first stage flip-flop 168 enables one of the inputs of an AND circuit 170 within the second stage of the register, the AND circuit 170 produces a logical zero output signal since the other input thereof which is coupled to the output of the NAND circuit 154 is not enabled. The signal on the compute line 158 does enable one of the inputs of an AND circuit 174 in the second stage of the Y register, and an output signal therefrom is passed by an OR circuit 176 to a NOT circuit 178 if a second input of the AND circuit 174 is enabled by a signal from the summing output $\Sigma$ of a full adder 180 in the second stage. The NOT circuit 178 inverts the signal at the input thereof to establish a signal condition of the input terminal of a flip-flop 182 within the second stage of the Y register. A signal appears at the complementary output $\overline{Q}$ of the flip-flop 182 to provide a bit signal $\overline{Y2Q}$ to the transfer-complementor logic circuit 116 via a lead 184.

The remaining stages of the 20-stage Y register similarly comprise flip-flops and full adders with the input logic of each flip-flop comprising an AND-OR-NOT circuit. Since the NOT portion of each AND-OR-NOT circuit responds to an input signal by inverting it to provide its complement, the complementary output $\overline{Q}$ of each flip-flop represents the logical state of each stage of the register, and a signal therefrom is passed as an input to the associated full adder. The AND, OR and NOT circuits 170, 174, 176 and 178 of the second stage are shown as AND-OR-NOT circuits 186 and 188 in the 19th and 20th stages of the Y register respectively. The circuits 186 and 188 function in a manner similar to the circuits 170, 174, 176 and 178 of the second stage to establish a signal condition at the input terminals of the associated flip-flops 190 and 192 whenever signals from the summing outputs $\Sigma$ of the associated full adders 194 and 196 enable the input of one of the AND circuits thereof.

In accordance with the invention, the sum of the $dy$ incremental inputs $\Sigma dy$ is simultaneously added in whole number form to the Y register with the carry propagating down the register. The $dy$ counter 106 and $\Sigma dy$ logic circuit 108 shown in FIG. 4 preferably comprise an arrangement which includes an up-down counter that accumulates the algebraic sum of the $dy$ increments. The up-down counter operates directly on the ternary input increments $dy$ by automatically incrementing or decrementing the number in the counter. The counter generates a total of three bits, two of which represent the value of the sum $\Sigma dy$ and the third of which represents the sign thereof. The counter generates a two's complement number for a negative algebraic sum. The two value bits conveniently designated D1Q and D2Q are algebraically added to the two least significant bit stages of the Y register while the sign bit conveniently designated DSQ is fanned-out to the remaining 18 more significant bit stages of the register. Accordingly D1Q and D2Q are respectively added to the full adders 162 and 180 in the first and second stages of the register while the sign bit DSQ is added to the full adders in the third through the 20th stages.

The presence of a separate full adder in each of the register stages enables the sum of the $dy$ increments to be added to the Y register in parallel fashion and further provides for the transfer of each updated value of Y into the R register via the transfer-complementor logic circuit 116 in parallel fashion.

Each full adder includes input and output terminals $C_{IN}$ and $C_{OUT}$, and any carry signals which result from the addition of bits to the different register stages propagate through the full adders in the various stages from the least significant bits toward the most significant bits to reflect changes in the states of appropriate ones of the flip-flops. The present state of each flip-flop is represented by the signal at the complementary output $\overline{Q}$ which is summed with the input signal as represented by D1Q, D2Q or DSQ in the associated full adder to change the state of the flip-flop via a signal at the summing output Σ of the full adder as appropriate. The true and complementary outputs Q and $\overline{Q}$ of each flip-flop are separately coupled to the transfer-complementor logic circuit 116 to indicate the present state of the flip-flop. In the 19th stage of the register, for example, a bit signal Y19Q indicates that the flip-flop 190 is in its true or Q state while a bit signal $\overline{Y19Q}$ indicates that the flip-flop is in its complementary or $\overline{Q}$ state. The operation of the Y register in parallel word fashion avoids the sequential shifting of bit signals into and out of the register in stage-by-stage fashion and results in a considerable saving in time.

As previously discussed, the presence of a compute mode command signal at the true inputs of the flip-flops 150 and 152 results in an enabling signal at the input of an AND gate within each register stage, thereby enabling the Y register to operate in parallel word fashion. The Y register can also be operated in parallel word fashion during the initialize and readout modes of operation, the initial conditions being loaded into the register and readout data being taken therefrom in rapid parallel word fashion. Such an arrangement however, requires a considerable amount of circuitry between the general purpose digital computer 12 and the integrators. The additional time required for serial word operation of the Y register during the initialize and readout modes of operation is not a serious limitation for most applications of the DDA.

The Y register is switched into a serial shift mode at the commencement of the initialize mode of operation by applying the initialize mode command signal from computer 12 to the complementary input of the flip-flop 150 in the Y register operation logic circuit 100. The resulting signal at the complementary output $\overline{Q}$ of the flip-flop 150 enables one of the inputs of an AND circuit 200 in the first stage of the Y register. The initial condition data from the computer 12 is applied to enable the other input of the AND circuit 200, and the resulting signals are processed by the OR circuit 164 and the NOT circuit 166 to determine the stage of the first stage flip-flop 168 accordingly. In the absence of the compute mode command signal, no signals appear at the inputs to the NAND circuit 154 and a signal is accordingly provided at the output thereof. The signal at the output of the NAND circuit 154 is inverted by the inverter 156 into a logical zero signal condition to disable the inputs to the AND circuit 160 in the first register stage, the AND circuit 174 in the second register stage, and the AND circuits within the AND-OR-NOT circuits 186 and 188 in the 19th and 20th register stages. At the same time, the output signal from the NAND circuit 154 enables one of the inputs of the AND circuit 170 in the second register stage. A signal at the complementary output $\overline{Q}$ of the first stage flip-flop 168 enables the other input of the AND circuit 170 so as to be passed via the OR circuit 176 and the NOT circuit 178 to the second stage flip-flop 182. The output signal from the NAND circuit 154 is passed via a shift line 202 to enable the inputs of AND circuits within the AND-OR-NOT of the remaining stages, the output signal from each flip-flop being passed to the input of the flip-flop in the next more significant bit stage.

During the readout mode of operation, the computer 12 applies a readout mode command signal to the complementary input of the flip-flop 152 to enable one of the inputs of an AND circuit 204 within the first stage of the register. The signals are logical zeros at both inputs of the NAND circuit 154, and the resulting signal at the output thereof is passed to the AND circuit 170 within the second stage and to corresponding AND circuits within the AND-OR-NOT circuits of the remaining stages to maintain the Y register in a serial shift mode of operation. The complementary output $\overline{Q}$ of the final or 20th stage flip-flop 192 is coupled via a readout recirculation loop 206 to the other input of the AND circuit 204 in the first register stage. The various bits stored within the Y register propagate along the length thereof 9n in serial fashion to the complementary output $\overline{Q}$ of the 20th stage flip-flop 192 where they are passed to the general purpose digital computed 12 as the desired readout data and simultaneously into the input end of the Y register via the recirculation loop 206 and the AND circuit 204. The readout recirculation loop 206 enables the Y parameter which is stored within the Y register to be preserved while being read out to the computer 12. The readout mode of operation may be terminated under the control of a bit timer whenever the various bits have reentered the register via the recirculation loop 206 and propagated to the desired register stages.

Figure 7:
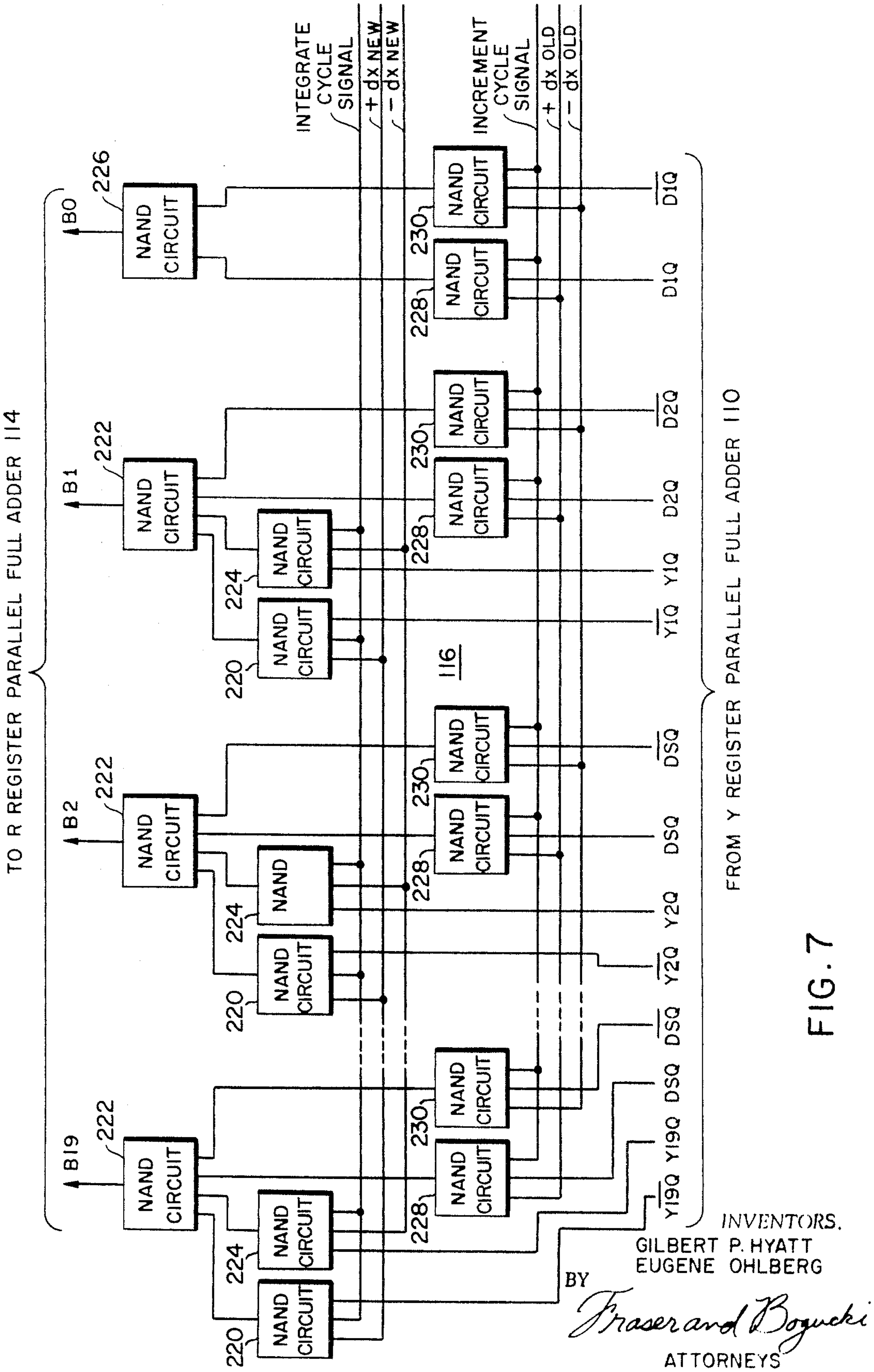
FIG. 7 is a block diagram showing the details of the transfer-complementor logic circuit in the integrator arrangement of FIG. 4.

The details of the transfer-complementor logic circuit 116 are shown in FIG. 7. The 20th stage bit of the Y register 102 which represents the sign of the Y parameter is applied to the overflow detector 134 shown in FIG. 4. The R register 104 however does not include a corresponding sign bit stage, and the value of R stored therein is always considered to be positive. The transfer-complementor logic circuit 116 receives the bit signals from the true and complementary outputs of the flip-flop in each Y register stage and transfers such bits into the corresponding stages of the R register during the integrate cycle of each iteration. If the independent variable $dx_{NEW}$ is positive in value, the Y parameter is added to the R register by a direct transfer of the various Y register bits into the R register. If the independent variable $dx_{NEW}$ is negative in value, the transfer-complementor logic circuit 116 subtracts the value of Y from the R register by generating the two's complement of Y and adding it to the R register. This is accomplished by inverting the bit signals from each Y register stage to form the one's complement thereof, then adding an increment to the least significant bit of the resulting number.

The circuitry associated with each of the first through the 19th stages of the R register includes a NAND circuit 220 having a first input coupled to the complementary output $\overline{Q}$ of the associated Y register flip-flop, a second input coupled to be enabled by an integrate cycle signal, and a third input coupled to be enabled whenever the independent incremental variable $dx_{NEW}$ is positive. The output of each of the NAND circuits 220 is coupled as one of the inputs of a NAND circuit 222 having three additional inputs. If all four inputs of each NAND circuit 222 are enabled by the presence of signals, the output thereof represents a value of "0" to the associated R register stage. If the value of $dx_{NEW}$ is positive, an integrate cycle signal is present, and one or more of the complementary inputs of the NAND circuit 220 are present, the three inputs of the NAND circuit 220 will be enabled resulting in the absence of a signal at the output thereof. The absence of a signal at the output of the NAND circuit 220 disables the associated input of the NAND circuit 222 resulting in an output signal to the corresponding R register stage to represent the value of the associated Y register flip-flop complementary output $\overline{Q}$.

A second input of each NAND circuit 222 is coupled to the output of an NAND circuit 224 having three inputs, one of which is coupled to receive a signal from the true output Q of the flip-flop in the corresponding Y register stage, a second of which is coupled to be enabled by a $dx_{NEW}$ of negative value, and a third input of which is coupled to be enabled by the integrate cycle signal. If a signal is present at the true output of one of the Y register flip-flops indicating that a value of "0" is stored therein, and such value is to be transferred to the corresponding R register stage under the control of an incremental value $dx_{NEW}$ which is positive, the associated NAND circuit 224 will provide an output signal to the NAND circuit 222 since the input terminal thereof which is coupled to the $-dx_{NEW}$ line is not enabled. The NAND circuit 220 likewise enables the corresponding input to the NAND CIRCUIT 222 since the input thereof which is coupled to the complementary output $\overline{Q}$ of the Y register flip-flop is not enabled. With the third and fourth inputs of the NAND circuit 222 also enabled, a logical zero signal is present at the output thereof and the value of the Y register flip-flop true output Q which is "0" is accordingly transferred into the associated R register stage. It will therefore be seen that the state or value of each flip-flop in the Y register is transferred directly into the associated stage of the R register when $dx_{NEW}$ is of positive value, the signal from the one-valued complementary output $\overline{Q}$ of each Y register flip-flop being applied to the associated NAND circuit 220 to provide an output signal from the NAND circuit 222 and the signal from the O valued true output Q of each Y register flip-flop being applied to the associated NAND circuit 224 to provide the output of the NAND circuit 222 with a logical zero signal.

The converse is true when $dx_{NEW}$ is of negative value. When such is the case, the one's complement of the value of Y is generated by enabling the corresponding input of each NAND circuit 224 to provide an output signal from the NAND circuit 222, and by disabling one of the inputs of the NAND circuit 220 to provide the absence of a signal at the output of the NAND circuit 222. A bit signal is added to the least significant bit stage of the R register to provide the two's complement of the Y parameter as discussed hereafter in connection with FIG. 8.

Figure 8:
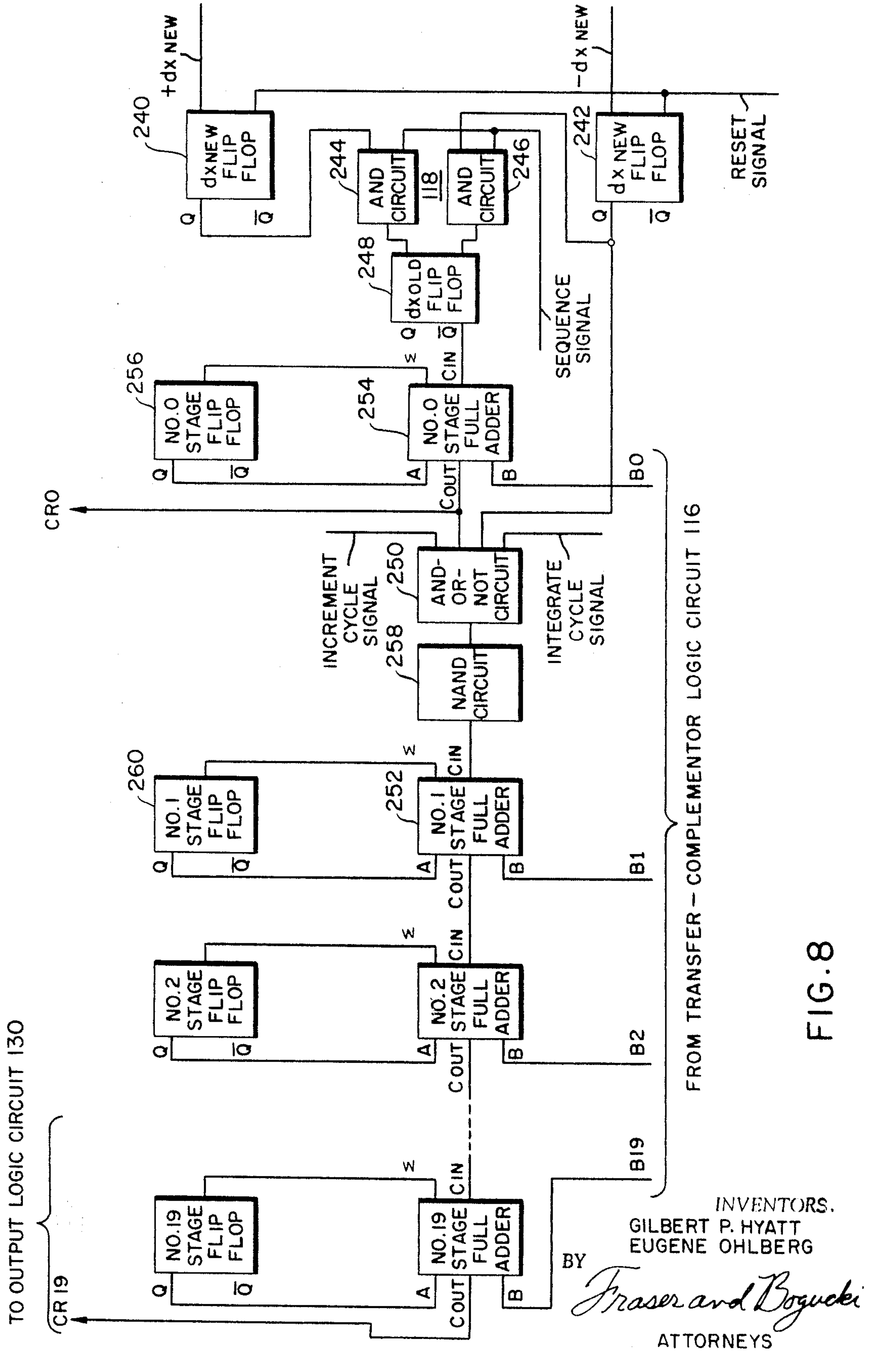
FIG. 8 is a block diagram showing the details of the R register in in the integrator arrangement of FIG. 4.

The input combinational logic circuit 90 shown in FIG. 3 is implemented in the present example of a second order term or trapezoidal correction scheme by the transfer-complementor logic circuit 116. For the second order term or trapezoidal correction the $dy$ increments to the counter 106 are weighted as a function of $dx_{OLD}$ such that one-half the sum of the $dy$ increments or $\Sigma dy/2$ is added to the R register 104 to perform the desired correction. The transfer-complementor logic circuit 116 performs the weighting function by transferring $\Sigma dy$ into the R register 104 during the increment cycle with a shift of 1 bit in the direction of the least significant bits of the R register. To accomplish this, the R register which is shown in detail in FIG. 8 is provided with a O stage into which the D1Q bit is transferred. The D2Q bit is transferred into the first stage of the R register and the sign bit DSQ is transferred into the remaining 18 stages. The third input of each of the NAND circuits 222 and the first input of a NAND circuit 226 associated with the O stage of the R register are coupled to the outputs of NAND circuits 228. One input of each NAND circuit 228 is coupled to be enabled by an increment cycle signal, a second input thereof is coupled to be enabled by a $dx_{OLD}$ of positive value, and a third input thereof is coupled to be enabled by a signal representing the sign bit DSQ in the case of the second through the 19th register stages and by the $\Sigma dy$ value bits D1Q and D2Q in the case of the O and first stages of the R register, respectively. If all three inputs of any of the NAND circuits 228 are enabled indicating a $dx_{OLD}$ which is positive in value a signal is absent at the output thereof and the associated NAND circuit 222 provides a signal at its output to the R register. If bits representing the complementary values of D1Q, D2Q and DSQ are instead present, the second inputs of the NAND circuits 228 are not enabled and the resulting signal at the output thereof is applied to the third input of the associated NAND circuits 222 to provide the absence of a signal at the outputs thereof. Bits representing the complementary values $\overline{D1Q}$, $\overline{D2Q}$ and $\overline{DSQ}$ are applied to the second input of a plurality of NAND circuits 230, the outputs of which are coupled to the fourth input of the NAND circuits 222 and to the second input of the NAND circuit 226. The first and third inputs of each NAND circuit 230 are respectively enabled by a $dx_{OLD}$ of negative value and by the increment cycle signal to transfer the one's complement of such value to the R register. The NAND circuits 230 accordingly respond to the enabling of all three inputs thereof to disable the associated input of the NAND circuit 222 and provide an output signal therefrom. If a $dx_{OLD}$ of positive value is present, the complementary values $\overline{D1Q}$, $\overline{D2Q}$, and $\overline{DSQ}$ will appropriately appear as logical zero signals at the output of the NAND circuits 222.

The R register 104, the R register parallel full adder 114, the trapezoidal correction logic circuit 118 and the $dx$ logic circuit 112 which are shown in FIG. 4 are illustrated in detail in FIG. 8. The $dx$ logic circuit 112 which comprises a pair of $dx_{NEW}$ flip-flops 240 and 242 aids in the addition of the Y value or the two's complement thereof to the R register 104 for positive and negative values of $dx_{NEW}$. The trapezoidal correction logic circuit 118 which comprises a pair AND circuits 244 and 246 and $dx_{OLD}$ flip-flop 248 stores each value of $dx_{NEW}$ to be used during the increment cycle of the subsequent iteration as $dx_{OLD}$, and aids in the addition of $\Sigma dy/2$ or the two's complement thereof to the R register 104 for positive and negative values of $dx_{OLD}$.

At the end of the first or pickup cycle of each iteration, an increment $dx_{OLD}$ which is of positive value is applied to the true input of the $dx_{NEW}$ flip-flop 240 to provide a signal at the true output Q which enables one of the inputs of the AND Circuit 244. An increment $dx_{NEW}$ of negative value is applied to the true input of the $dx_{NEW}$ flip-flop 242 to provide a signal at the true output Q thereof. Such output signal enables one of the inputs of the AND circuit 246 and an input of an AND circuit within an AND-OR-NOT circuit 250 at the carry input of a full adder 252 within the first stage of the R register. At the commencement of the second or increment cycle of each iteration, the sum $\Sigma dy/2$ is added to the R register under the control of $dx_{OLD}$ as previously discussed in connection with FIG. 7. The first and second value bits D1Q and D2Q of the sum $\Sigma dy$ are respectively added to the )O and 1 stages of the R register to transfer only one-half of the value of $\Sigma dy$. For negative values of $dx_{OLD}$ the one's complement of the sum $\Sigma dy/2$ is transferred into the R register. The two's complement of the transferred one's complement value is provided by the $dx_{OLD}$ flip-flop 248, the complementary output Q of which is coupled to provide the signal thereon to carry input $C_{IN}$ of a full adder 254 within the O stage of the register for negative values of $dx_{OLD}$. The addition of this bit to the least significant bit stage of the R register changes the transferred one's complement of the sum $\Sigma dy/2$ into the two's complement to effect the desired subtraction for the negative value of $dx_{OLD}$.

The memory elements 92 shown in the arrangement of FIG. 3 are provided by the flip-flop 256 of the R register O stage in the correction scheme of the present example. Similarly, the output combinational logic circuit 94 is provided by the full adder 254 of the O stage, the full adder 254 in the present case adding each new value of the correction parameter or $\Sigma dy/2$ to the R register.

The full adder 254 sums the present state of the associated flip-flop 256 within the O stage of the R register at an input A with the bit signal from the transfer-complementor logic circuit 116 at an input B and carry input from the $dx_{OLD}$ flip-flop 248 to provide a signal at the sum output $\Sigma$ which changes the state of the flip-flop 256 as appropriate. If the summation results in a carry output, such output is applied to one of the inputs of an AND gate within the AND-OR-NOT circuit 250, the other input of the AND gate being enabled by the increment cycle signal. The resulting absence of a signal at the output of the AND-OR-NOT circuit 250 is inverted by a NAND circuit 258 to provide a carry input to the full adder 252 of the first R register stage. The first stage includes a flip-flop 260 and the second through the 19th stages include full adders and flip-flops. The full adder and flip-flop in each of the R register stages one through 19 function in the same manner as the full adder and flip-flop 254 and 256 of the O stage, the full adder of each stage summing the present state of the associated flip-flop at an input A with the carry inputs $C_{IN}$ and a bit signal from the transfer-complementor logic circuit 116 at an input B to change the state of the flip-flop and generate a carry output $C_{OUT}$ as appropriate.

At the end of the increment cycle a sequence signal is applied to enable the second inputs of the AND circuits 244 and 246 within the trapezoidal correction logic circuit 118. At this time, the independent incremental value $dx_{NEW}$ during the next iteration, positive values of $dx_{NEW}$ being transferred via the AND circuit 246. At the commencement of the third or integrate cycle the various bits representing the Y parameter are transferred into the R register under the control of $dx_{NEW}$ as previously described in connection with FIG. 7, the bits being added into the R register for positive values of $dx_{NEW}$ and the one's complement thereof being added into the R register for negative values of negative values of $dx_{NEW}$. The addition of stage of the R register to change the one's complement into a two's complement is accomplished by the $dx_{NEW}$ flip-flop 242 and the AND-OR-NOT circuit 250, the output signal at the true output signal at the true output Q of the flip-flop 242 being applied to the input of one of the AND gates within the AND-OR-NOT circuit 250. The other input of the AND gate is enabled by the integrate cycle signal and a logical zero signal at the output of the AND-OR-NOT circuit 250 is inverted by the NAND circuit 250 to provide a carry input to the full adder 252 of the first R register stage.

It will be appreciated from the foregoing discussion that electrically alterable digital differential analyzers in accordance with the present invention provide significant advantages over conventional arrangements. The interconnection of the computational elements thereof may be programmed directly from a general purpose digital computer or other appropriate external device, and complete interconnectivity of any output with any one or more inputs may be provided. By encoding the incremental output signals in the time domain as well as the space domain at the expense of a slight increase in the time required for interconnection, a considerable amount of hardward is saved without detracting from the significant advantages thereof. Scaling is accomplished by the automatic selection of register length, and the use of 16 different output lines from each integrator provides scale factors in excess of 65,000. Higher order correction may be implemented without the addition of excessive amounts of hardware by an arrangement which stores values of $dx$ rather than Y. The speed of electrically alterable interconnection coupled with the operation of the integrators in parallel word fashion provides for iteration rates on the order of 1MegaHertz or greater.

Although there has been described a specific arrangement of an electrically alterable digital differential analyzer in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What we claim is:

1. An electrically alterable digital differential analyzer comprising the combination of a plurality of computational elements, each of which includes an output inputs, a plurality of electrical conductor means, each being associated with a different group of computational elements within the plurality of computational elements, separate means coupled between each of the electrical conductor means and the outputs of the computational elements within the associated group for multiplexing signals at the outputs onto the associated electrical conductor means in predetermined order, means for providing a plurality of signal conditions which identify the particular ones of the electrical conductor means carrying signals to be applied as input signals to the computational elements, and means responsive to the signal conditions for substantially simultaneously coupling the inputs of selected ones of the computational elements to selected ones of the electrical conductor means.

2. An electrically alterable digital differential analyzer in accordance with claim 1, wherein the computational elements comprise integrators, each of which includes first and second registers, means for summing input signals which appear at selected ones of the inputs thereof, means responsive to the summing means for periodically adding the sum of the input signals to the first register in parallel word fashion, means coupled between the first and second registers for periodically transferring signals from the first register into the second register in parallel word fashion, said second register comprising a plurality of different register stages, each of which includes an output terminal, and further comprising means for providing a plurality of scaling signal conditions which identify a particular one of the output terminals of each integrator to be used to provide an output signal, and means coupled to the output terminals of each integrator and responsive to the scaling signal conditions to couple a selected one of the output terminals of each integrator to the multiplexing means as the integrator output.

3. An electrically alterable digital differential analyzer in accordance with claim 1, wherein the means for providing a plurality of signal conditions comprises means for generating signals which define a desired interconnection of the computational element inputs and the electrical conductor means for each of a series of signals provided by the computational elements to the outputs thereof, and a plurality of registers coupled to receive the generated signals, said registers assuming logical states in accordance with the values of the generated signals.

4. An electrically alterable digital differential analyzer in accordance with claim 3, wherein the means for generating signals which define a desired interconnection comprises a general purpose digital computer.

5. An electrically alterable digital differential analyzer in accordance with claim 1, wherein each of the separate means for multiplexing time multiplexes signals at the outputs of the associated group of computational elements onto the associated electrical conductor means, and further including means for providing a plurality of signal conditions which identify the time positions of the signals to be applied as input signals to the computational elements, and wherein the means for substantially simultaneously coupling the inputs of selected ones of the computational elements to selected ones of the electrical conductor means includes means associated with each of the inputs and responsive to the time position identification signal conditions to prevent the passage of signals from the selected ones of the electrical conductor means to the coupled inputs except during a selected time interval.

6. An electrically alterable digital differential analyzer in accordance with claim 5, wherein the computational elements comprise integrators and the electrical conductor means comprise buses.

7. An electrically alterable digital differential analyzer in accordance with claim 5, further including means for providing a plurality of inhibit signal conditions which identify those computational element inputs which are not to receive an input signal, and means for providing a plurality of sign change signal conditions which identify those computational element inputs which are to receive an input signal of reversed sign, and wherein the means for substantially simultaneously coupling the inputs of selected ones of the computational elements to selected ones of the electrical conductor means includes means associated with each of the inputs and responsive to the inhibit signal conditions to prevent the passage of all signals from the selected ones of the electrical conductor means to the coupled inputs, and means associated with each of the inputs and responsive to the sign change signal condition for changing the signs of the input signals thereto.

8. An electrically alterable digital differential analyzer comprising the combination of a plurality of computational elements which undergo successive iterations, each of the computational elements having an electrical output and a plurality of different electrical inputs, a plurality of buses, means for generating clock pulses, separate means coupled to the output of each computational element and responsive to a particular one of the clock pulses for time encoding signals from the output terminal of the associated computational element at the start of each iteration, separate means coupled between each bus and a different plurality of time encoding means and responsive to the clock pulses for multiplexing the time encoded signals from the associated time encoding means onto the associated one of the buses, and time and space decoding means coupled between each input of the computational elements and the buses, said time and space decoding means comprising a space domain selection program register for storing bit signals representing the particular one of the buses which carries the desired input signal for the associated input for each iteration, a time domain selection program register for storing bit signals representing the time position of the desired input signal for the associated input for each iteration, time position selection means coupled to the associated input and operative to pass a signal applied thereto to the associated input when enabled, means responsive to the bit signals stored by the space domain selection program register for decoding the information represented thereby, means responsive to the space decoding means and coupled to each of the buses for coupling a particular one of the buses to the time position selection means in accordance with the decoded information, means responsive to the bit signals stored by the time domain selection program register for generating a signal the time of occurrence of which corresponds to the information represented thereby, and gating means responsive to the clock pulses and the generated signal for enabling the time position selection means whenever the generated signal and a clock pulse coincide in time.

9. An electrically alterable digital differential analyzer in accordance with claim 8, further including means for providing signals which represent programmed interconnections of the computational element inputs and outputs, and logic means coupled to the space and time domain program registers and responsive to the programmed interconnection signals for selecting the states of the program registers in accordance with a particular logic scheme.

10. An electrically alterable digital differential analyzer in accordance with claim 8, wherein the computational elements comprise integrators, each of which includes a register having a plurality of stages with output coupled thereto, means for coupling a selected one of the output lines to the time encoding means as the output of the computational element, means for selectively preventing passage of input signals to different ones of the computational element inputs, and means for selectively reversing the polarity of input signals to different ones of the computational element inputs.

11. An integrator comprising the combination of a first register having a plurality of stages for storing a quantity Y, a second register having a plurality of stages for storing a quantity R, means for serially loading initial conditions into the first register, means for summing a plurality of dependent incremental values *dy* received during each iteration of the integrator, means for adding the sum of the *dy* values received during a particular iteration to the quantity Y in whole number form, means coupling at least some of the stages of the first register to different ones of the stages of the second register, and means for transferring the quantity Y into the second register via the interconnected stages of the registers in parallel word fashion under the control of an independent incremental value *dx* during the particular iteration.

12. An integrator in accordance with claim 11, wherein each of the stages of the first and second registers comprises a bistable memory element and an associated logic circuit including a full adder, each logic circuit being coupled to set the state of the associated memory element in accordance with the sum of an input signal, a signal representing the present state of the memory element, and a carry signal from the logic circuit of the next least significant bit stage of the register.

13. An integrator in accordance with claim 11, wherein the means for summing a plurality of dependent incremental values *dy* provides first and second bits representing the value of the sum of the *dy* values and a third bit representing the sign of the value of the sum of the *dy* values, and the means for adding the sum of the *dy* values to the quantity Y in whole number form includes means for entering the first and second bits into the two least significant stages of the first register, and means for entering the third bit into all other stages of the first register.

14. In an integrator wherein at least one dependent incremental variable *dy* is algebraically added to a first register to update a quantity Y stored therein and the updated value of Y transferred into a second register under the control of an independent incremental variable *dx* during each iteration of the integrator, means for selectively changing the quantity stored within the second register to perform a higher order correction for each updated value of Y comprising means for storing the *dy* and *dx* variables which are received during each iteration of the integrator, means for weighting the stored values of *dy* in accordance with the values of the stored *dx* incremental variables during a subsequent iteration, and means for algebraically adding the weighted values of *dy* to the quantity stored within the second register during the subsequent iteration.

15. The improvement defined in claim 14 above, wherein a separate *dx* incremantal variable is stored for each higher order to which a particular updated value of Y is to be corrected, the values of *dy* being weighted and algebraically added to the quantity stored within the second register.

16. The improvement defined in claim 14 above, wherein the at least one dependent incremental variable *dy* is algebraically added to the first register in parallel word fashion, the updated value of Y is transferred into the second register in parallel word fashion, and the weighted values of *dy* are added to the second register in parallel word fashion.

17. An integrator comprising the combination of a first register for storing a quantity Y, a second register for storing a quantity R, said first and second registers each comprising a plurality of different bit stages of ascending binary significance, means for receiving a plurality of dependent incremental values *dy* during each iteration of the integrator, means for adding the *dy* values received during a particular iteration to the quantity Y, means coupling at least some of the stages of the first register to different ones of the stages of the second register, means for transferring the quantity Y into the second register via the interconnected stages of the registers in parallel word fashion under the control of an independent incremental value *dx* during the particular iteration, means for storing the preceding incremental nonzero values *dx*, and means for adding weighted values of *dy* to the quantity R under the control of the stored values of the preceding nonzero *dx* value.

18. A digital differential analyzer comprising a plurality of integrators, at least some of which include a register having a plurality of flip-flops and an associated plurality of full adders, each flip-flop and an associated full adder defining a different bit stage of the register, means for normally interconnecting the full adders and flip-flops to effect a parallel word operation of the register, said interconnecting means comprising means for interconnecting each flip-flop and an associated full adder such that the full adder controls the new stage of the flip-flop by determining the sum of a signal representing the present state of the flip-flop, an input signal, and a carry signal which may be provided by the full adder of the next less significant bit stage, and means for coupling each full adder to the full adder of the next more significant bit stage such that a carry signal which may be generating in each stage is passed to the next stage.

19. A digital differential analyzer in accordance with claim 18, wherein said at least some of the integrators further comprise means coupled to receive a plurality of incremental input signals for generating a plurality of bit signals, one of which represents the sign of the sum of the incremental input signals and the others of which represent the value of the sum of the incremental input signals, and means for simultaneously applying each value bit signal to a different one of the full adders of the less significant bit stages of the register as input signals thereto and the sign bit signal to the full adders of the remaining more significant bit stages of the register as input signals thereto.

20. A digital differential analyzer in accordance with claim 18, wherein said at least some of the integrators further comprise means for selectively interconnecting the inputs and outputs of the flip-flops within successive stages of the register to effect a serial shift mode of operation.

21. A digital differential analyzer in accordance with claim 20, wherein said at least some of the integrators further comprise means for selectively coupling the output of the flip-flop within the most significant bit stage of the register to the input of the flip-flop within the least significant bit stage of the register to effect a recirculation of the information stored within the flip-flops during a readout mode of operation.

22. A digital differential analyzer in accordance with claim 18, wherein said at least some of the integrators further comprise a second register having a plurality of flip-flops and an associated plurality of full adders, each flip-flop and an associated full adder defining a different bit stage of the register, means for interconnecting the full adders and flip-flops to effect a parallel word operation of the register, said interconnecting means comprising means for interconnecting each flip-flop and associated full adder such that the full adder controls the new state of the flip-flop by determining the sum of a signal representing the present state of the flip-flop, an input signal, and a carry signal which may be provided by the full adder of the next less significant bit stage, and means for coupling each full adder to the next more significant bit stage such that a carry signal which may be generated in each stage is passed to the next stage, and further comprising means responsive to the receipt of an independent incremental value for coupling the outputs of at least some of the flip-flops within the first register to pass signals representing the states thereof as input signals to the at least some of the full adders within the second register to effect a transfer of information therebetween in parallel word fashion.

23. A digital differential analyzer in accordance with claim 22, further including means coupled to the carry output of a selected one of the full adders in the second register for providing an incremental output signal from the integrator, a plurality of buses, means coupled to receive the output signal for multiplexing the signal onto a selected one of the buses, and at least one means coupled to all of the buses for passing a signal carried by a selected one of the buses to the integrator as a dependent incremental input value.

24. A digital differential analyzer in accordance with claim 22, wherein the means for coupling the outputs of at least some of the flip-flops includes means for passing signals representing the actual values of the states of the flip-flops to the at least some of the full adders within the second register to effect a direct addition of the value stored in the first register to that stored in the second register whenever the independent incremental value is a positive value, and means for passing signals representing the two's complement of the states of the flip-flops to the at least some of the full adders within the second register to effect a subtraction of the value stored in the first register from that stored in the second register whenever the independent incremental value is a negative value, the means for passing signals representing the two's complement comprising means for inverting the signals appearing at the outputs of the at least some of the flip-flops in the first register to form the one's complement thereof, and means for adding a bit signal to the least significant bit stage of the second register.

25. A digital differential analyzer in accordance with claim 22, wherein the second register includes a stage representing a bit which is lower in significance than the bit represented by the least significant stage of the first register, and further comprising means coupled to receive a plurality of incremental input signals for generating a plurality of bit signals representative of the sum thereof, the least significant one of the generated bit signals being transferred into the least significant bit stage of the second register to implement a trapezoidal correction of the value previously transferred from the first register into the second register.

PO-1050
(5/69)

UNITED STATES PATENT OFFICE
CERTIFICATE OF CORRECTION

Patent No. 3,586,837 Dated June 22, 1971

Inventor(s) Gilbert P. Hyatt et al

It is certified that error appears in the above-identified patent and that said Letters Patent are hereby corrected as shown below:

Column 1, line 17, after "which", "19th" should read --is--. Column 2, line 34, after "and" and before "sign" insert --the--; line 48, "systems" should read --system--. Column 3, line 27, "work" should read --word--. Column 4, line 14, "computed" should read --computer--; line 19, "computed" should read --computer--; line 32, "follow" should read --follows--. Column 5, line 23, after "on" and before "selected", "tee" should read --the--. Column 6, line 19, before "time domain" delete "14"; line 61, after "increment" and before "is passed" insert --are enabled when the enabling pulse from the generator 26 is present, and the signal representing the dz increment--. Column 7, line 35, "inhibitor" should read --inhibit--. Column 8, line 59, "resistors" should read --registers--. Column 11, line 49, "18th" should read --20th--. Column 12, line 70, after "includes" and before "input" insert --carry--. Column 13, line 40, "stage" (first occurrence) should read --state--; line 74, after "thereof" delete "9n". Column 14, line 1, "computed" should read --computer--; line 44, after "inputs" delete "of"; line 45, before "NAND" delete "the" and insert --to each--. Column 16, line 8, "$dx_{OLD}$" should read --$dx_{NEW}$--; line 10, "Circuit" should read --circuit--; line 21, after "added to the" delete ")O" and insert --O--; line 26, "Q" should read --$\overline{Q}$--; line 27, after "to" (second occurrence) insert --the--; line 29, after "of the" and before "register" insert --R--; line 44, after "and" and before "carry" insert --the--; line 67, after "$dx_{NEW}$" and before "during" insert --is stored in the $dx_{OLD}$ flip flop 248 to be used as $dx_{OLD}$--; line 68, after "via the" insert --AND circuit 244 and negative values of $dx_{NEW}$ being transferred via the--; line 75, delete "negative values of" (second occurrence); line 75, after "addition of" insert --a bit to the least significant or first--. Column 17, line 4, after "true output" (first occurrence) delete "signal at the true output"; line 32,

PO-1050
(5/69)

UNITED STATES PATENT OFFICE
CERTIFICATE OF CORRECTION

Patent No. 3,586,837 Dated June 22, 1971

Inventor(s) Gilbert P. Hyatt et al (continued)

It is certified that error appears in the above-identified patent and that said Letters Patent are hereby corrected as shown below:

"MegaHertz" should read --megahertz--; line 46, after "output" insert --and a plurality of--.
Column 19, line 31, after "output" insert --lines--. Column 20, line 12, "incremantal" should read --incremental--.

Signed and sealed this 11th day of April 1972.

(SEAL)
Attest:

EDWARD M.FLETCHER,JR.
Attesting Officer

ROBERT GOTTSCHALK
Commissioner of Patents